(12) United States Patent
Berkowitz et al.

(10) Patent No.: US 11,487,499 B2
(45) Date of Patent: Nov. 1, 2022

(54) SYSTEMS, METHODS AND COMPUTER PROGRAM PRODUCTS FOR CONTROLLING THE AUDIO LEVELS OF MULTIPLE SIMULTANEOUS COMMUNICATION CHANNELS

(71) Applicant: IPC Systems, Inc., Jersey City, NJ (US)

(72) Inventors: Brett R. Berkowitz, New York, NY (US); Stephen J. Minutillo, North Haven, CT (US); James J. Riccio, Newtown, CT (US)

(73) Assignee: IPC SYSTEMS, INC., Jersey City, NJ (US)

( * ) Notice: Subject to any disclaimer, the term of this patent is extended or adjusted under 35 U.S.C. 154(b) by 0 days.

(21) Appl. No.: 17/202,816

(22) Filed: Mar. 16, 2021

(65) Prior Publication Data

US 2021/0200508 A1 Jul. 1, 2021

Related U.S. Application Data

(63) Continuation of application No. 15/139,661, filed on Apr. 27, 2016, now Pat. No. 10,996,918.

(Continued)

(51) Int. Cl.
*G06F 3/16* (2006.01)
*H04M 3/56* (2006.01)
(Continued)

(52) U.S. Cl.
CPC .............. *G06F 3/165* (2013.01); *G06F 3/162* (2013.01); *G06Q 10/10* (2013.01); *H04L 65/1053* (2013.01); *H04L 65/1069* (2013.01); *H04L 65/1101* (2022.05); *H04L 65/1104* (2022.05); *H04M 1/2477* (2013.01); *H04M 1/6025* (2013.01); *H04M 3/569* (2013.01); *H04M 3/58* (2013.01); *H04M 9/003* (2013.01); *H04L 65/403* (2013.01)

(58) Field of Classification Search
CPC ..... G06F 3/165; G06F 3/162; H04L 65/1006; H04M 1/6025; H04M 3/569
USPC ..................................................... 379/204.01
See application file for complete search history.

(56) References Cited

U.S. PATENT DOCUMENTS 6,061,458 A 5/2000 East
6,453,022 B1 * 9/2002 Weinman, Jr. ........ H04M 3/568
379/202.01

(Continued)

OTHER PUBLICATIONS http://erikhawkins.berkleemusicblogs.com/2009/06/27/when-to-solo/ Erik Hawkins, When To Solo, Music Production & Remixing, Jun. 27, 2009, 6 pages.

(Continued)

*Primary Examiner* — Ahmad F. Matar
*Assistant Examiner* — Jirapon Intavong
(74) *Attorney, Agent, or Firm* — Merchant & Gould P.C.

(57) ABSTRACT

Methods, systems and computer program products are provided for aggregating active speaker channels, receiving, through an input interface, a selection of a solo speaker channel representing one of the plurality of speaker channels and setting the audio level of any one of the solo speaker channel and at least one non-solo speaker channel, or a combination of both the solo speaker channel and the at least one non-solo speaker channel.

16 Claims, 5 Drawing Sheets

Related U.S. Application Data

(60) Provisional application No. 62/181,629, filed on Jun. 18, 2015.

(51) Int. Cl.

| | | |
|---|---|---|
| *G06Q 10/10* | (2012.01) | |
| *H04L 65/1069* | (2022.01) | |
| *H04L 65/1101* | (2022.01) | |
| *H04L 65/1104* | (2022.01) | |
| *H04L 65/1053* | (2022.01) | |
| *H04M 1/60* | (2006.01) | |
| *H04M 1/247* | (2021.01) | |
| *H04M 3/58* | (2006.01) | |
| *H04M 9/00* | (2006.01) | |
| *H04L 65/403* | (2022.01) | |

(56) References Cited

U.S. PATENT DOCUMENTS

| | | |
|---|---|---|
| 7,317,791 B2 | 1/2008 | Carlson |
| 7,983,199 B1 | 7/2011 | Nguyen |
| 8,767,942 B2 | 7/2014 | Elliott |
| 8,831,664 B2 | 9/2014 | Shaffer |
| 9,178,773 B1 | 11/2015 | Tassone |
| 2004/0008635 A1 | 1/2004 | Nelson |
| 2005/0076128 A1 | 4/2005 | Tsai |
| 2005/0094792 A1 | 5/2005 | Berthold |
| 2006/0063551 A1 | 3/2006 | Martin |
| 2007/0263783 A1 | 11/2007 | Speranza |
| 2009/0074169 A1 | 3/2009 | Mohan |
| 2009/0098898 A1 | 4/2009 | Patterson |
| 2009/0109961 A1 | 4/2009 | Garrison |
| 2011/0013786 A1* | 1/2011 | Odom ............... H04R 5/04 381/109 |
| 2012/0069986 A1 | 3/2012 | Edholm |
| 2012/0121076 A1 | 5/2012 | Yoakum |
| 2013/0019199 A1* | 1/2013 | Ko ............... G06F 3/04817 715/781 |
| 2014/0126710 A1 | 5/2014 | Boss |
| 2014/0241340 A1* | 8/2014 | Seligmann ............ H04M 9/003 370/352 |
| 2015/0263688 A1 | 9/2015 | Nicolino, Jr |

OTHER PUBLICATIONS http://www.studio-tech.com/pdfs/archive/ug 7677 7.pdf Studio Comm for Surround, Model 76 Central Controller and Model 77 Control Console, User Guide, Issue 7, Aug. 2012, 37 pages.

International Search Report and Written Opinion of the International Searching Authority in PCT/US2016/029504, dated Aug. 7, 2016.

* cited by examiner

SYSTEMS, METHODS AND COMPUTER PROGRAM PRODUCTS FOR CONTROLLING THE AUDIO LEVELS OF MULTIPLE SIMULTANEOUS COMMUNICATION CHANNELS

CROSS-REFERENCE TO RELATED APPLICATION

This application is a continuation of U.S. patent application Ser. No. 15/139,661 filed Apr. 27, 2016, now U.S. Pat. No. 10,996,918, which application claims priority to U.S. Provisional Application No. 62/181,629 filed Jun. 18, 2015, the contents of each of which are incorporated herein by reference.

BACKGROUND

Field

Example aspects described herein relate generally to communication systems, and more particularly to systems, methods and computer program products for controlling the audio levels of multiple simultaneous communication channels.

Related Art

A turret system is a specialized key telephony switching system that allows a relatively small number of users to access a large number of external lines. It provides enhanced communication features such as hoot-n-holler, push-to-talk, intercom, video, and large-scale conferencing. A turret device (or simply "turret") is a component that enables a user to control multiple dedicated, always-on lines of communication that can be used to allow for simultaneous communications with multiple parties. Turret devices can have dual handsets, multichannel speaker modules, and several communication lines.

One problem with typical arrangements is that while a turret with speaker module(s) allows multiple simultaneous conversations to exist, a listener may, based on real time conversations, decide a conversation on one channel is more important than others. However the user may experience difficulty making out the entire conversation due to the other simultaneous conversations. Dropping the remaining calls is not an option since the listener still may want the option to substantially hear and focus on other conversations as different topics arise. Simply muting the other calls is not always an option either.

While typical turret systems allow a user to listen to multiple simultaneous speaker channels, to adjust the volume of any particular communications channel the user needs to adjust the audio level for each speaker channel individually. The problem with this process is that it is inefficient in that in order to focus on a particular communications channel the operator needs to adjust the audio level for several communication channels. Moreover, existing systems do not provide the ability to memorize the call settings related to volume for each communication channel.

BRIEF DESCRIPTION

The example embodiments described herein address the foregoing by providing methods, systems and computer program products for controlling the audio level of multiple simultaneous communication channels. Data is received from multiple data sources, the data comprising active audio or video communications. An aggregated interface of the data from the data sources is presented. In response to selection of one of the data sources via the interface, a volume of the communication corresponding to the selected data sources remains unchanged, and the volume on all the other communications is lowered.

By lowering the volume on all the other conversations and leaving the selected conversation volume unchanged, it is ordinarily possible for a user of a turret, e.g., a user listening to multiple conversations, to select a single conversion with a single action and allow the listener to better hear that conversation over the other conversations, without increasing speaker volume, which would be detrimental to "neighboring" turret users.

In one embodiment, a turret device including at least one processor and an input interface is provided. The at least one processor is operable to aggregate a plurality of active speaker channels and the input interface is communicatively coupled to the at least one processor and is operable to receive a selection of a solo speaker channel representing one of the plurality of active speaker channels. The at least one processor is also operable to set the audio level of any one of the solo speaker channel and at least one non-solo speaker channel, or a combination of both the solo speaker channel and the at least one non-solo speaker channel.

The turret device can be configured such that the audio level for the solo speaker channel remains unchanged and the audio level for each non-solo speaker channel is attenuated by a predetermined level such that each non-solo speaker channel remains audible.

The turret device can also include a memory operable to store a non-solo speaker channel audio level offset value, such that when the input interface receives the selection of the solo speaker channel, the at least one processor attenuates the at least one non-solo speaker channel based on the non-solo speaker channel audio level offset value.

The turret device can also include a memory operable to store a non-solo audio level configuration setting value corresponding to the at least one non-solo speaker channel and a solo audio level configuration setting value corresponding to the solo speaker channel, such that when the input interface receives the selection of the solo speaker channel, the at least one processor uses the non-solo audio level configuration setting value to set the audio level for the at least one non-solo speaker channel and the solo audio level configuration setting value to set the audio level for the solo speaker channel.

The turret device can also include an output display operable to display a solo button icon for each of the plurality of speaker channels, each solo button icon indicating a solo mode state of a corresponding one of the plurality of speaker channels. In this example embodiment, the at least one processor causes the solo button icon to change to a different icon based on the solo mode state of each one of the plurality of speaker channels, correspondingly.

In an example aspect, depressing a solo button for a predetermined time causes a solo channel volume control to be displayed on an output display such that the solo channel volume control can be adjusted through the input interface to controls the audio level of the solo speaker channel.

In yet another embodiment, the turret device further includes an output display operable to display a speaker channel status summary. In this embodiment, the speaker channel status summary including symbols representing a state of each of the plurality of speaker channels, the state being any one of (i) solo-mode, (ii) a non-solo mode, and (iii) a solo-disabled mode.

In another embodiment, a method for controlling volume of multiple simultaneous calls is performed by aggregating a plurality of active speaker channels, receiving, through an input interface, a selection of a solo speaker channel representing one of the plurality of speaker channels, and setting the audio level of any one of the solo speaker channel and at least one non-solo speaker channel, or a combination of both the solo speaker channel and the at least one non-solo speaker channel.

The method can further include the step of attenuating the at least one non-solo speaker channel by a predetermined level such that each non-solo speaker channel remains audible. In this embodiment, the audio level for the solo speaker channel remains unchanged.

The method can further includes the steps of storing a non-solo speaker channel audio level offset value and attenuating the at least one non-solo speaker channel based on the non-solo speaker channel audio level offset value.

The method can further include the steps of storing a non-solo audio level configuration setting value corresponding to the at least one non-solo speaker channel and a solo audio level configuration setting value corresponding to the solo speaker channel, setting the audio level for the at least one non-solo speaker channel based on the non-solo speaker level configuration setting value, and setting the audio level for the solo speaker channel based on the solo audio level configuration setting value.

In yet another embodiment, the method can further include displaying, by an output display, a solo button icon for each of the plurality of speaker channels, each solo button icon indicating a solo mode state of a corresponding one of the plurality of speaker channels, and changing the solo button icon to a different icon based on the solo mode state of each one of the plurality of speaker channels, correspondingly.

The method can also include receiving a selection at a solo button displayed on an output display for a predetermined time. After the predetermined time, a solo channel volume control is displayed on the output display and input is received using the solo channel volume control, via the input interface, to cause the audio level of the solo speaker channel to be raised or lowered.

The method can also provide displaying a speaker channel status summary, the speaker channel status summary including symbols representing a state of each of the plurality of speaker channels, the state being any one of (i) solo-mode, (ii) a non-solo mode, and (iii) a solo-disabled mode.

A non-transitory computer-readable medium having stored thereon one or more sequences of instructions for causing one or more processors to perform the above methods is also provided

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The present invention is directed to systems, methods and computer program products for controlling the audio levels of multiple simultaneous communication channels, which will now be described in more detail herein in terms of an exemplary turret device. This is for convenience only and is not intended to limit the application of the present invention. In fact, after reading the following description, it is apparent to one skilled in the relevant art(s) how to implement the following invention into soft phones and Private Branch Exchange (PBX) phones. Moreover, the environment in which such systems, methods and computer program products are employed is not limited. The embodiments described herein also can be implemented in various environments including trading, security/law enforcement, public safety utilities, healthcare, and customer support (e.g., contact centers) environments.

As used herein, the term "solo speaker channel" means one of many communications channels that has been selected by use of an interface (e.g., a touchscreen interface) and prioritized relative to the other communication channels.

Figure 1:
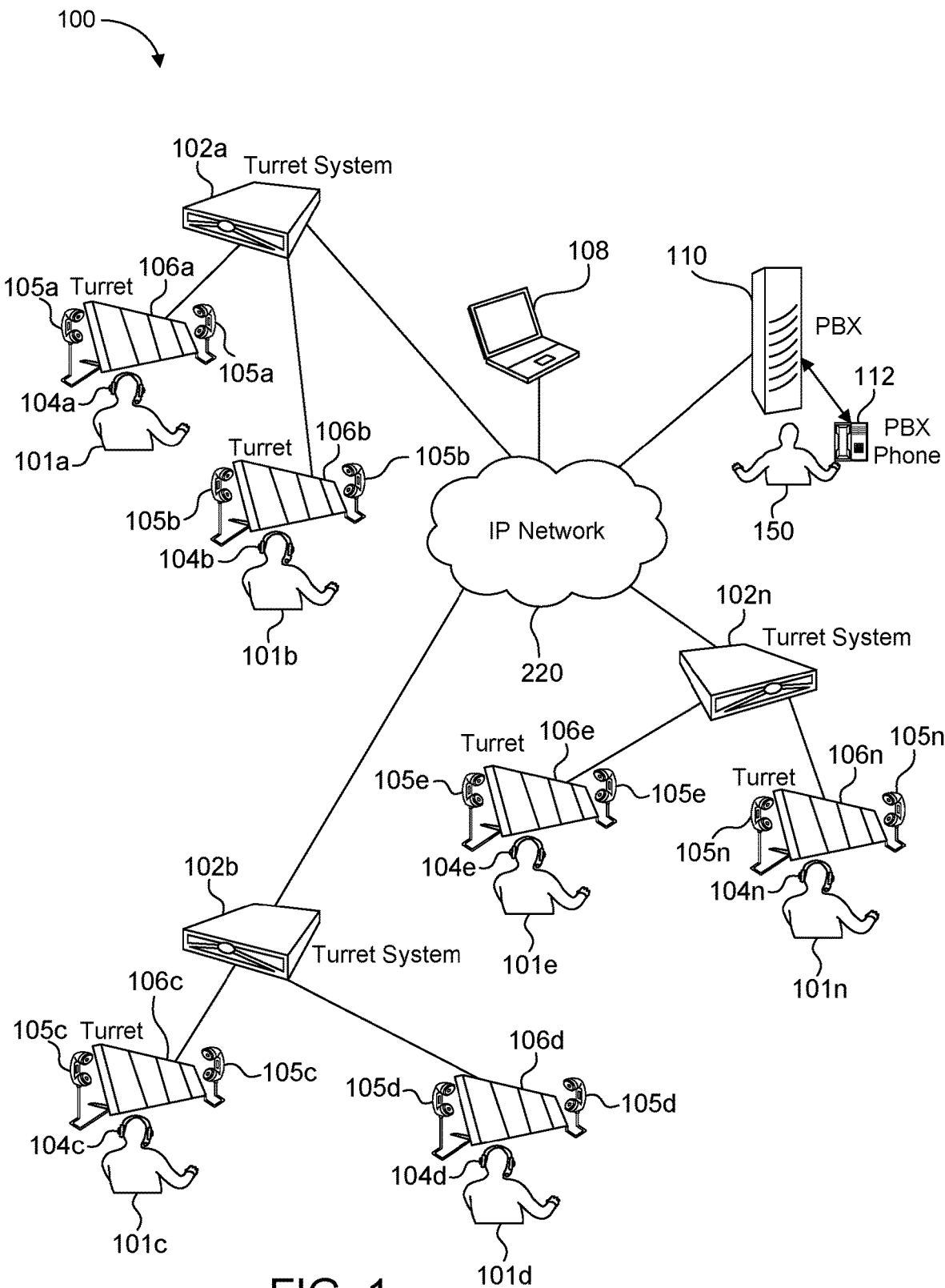
FIG. 1 depicts an example communication system in accordance with an embodiment of the present invention.

FIG. 1 depicts an example communication system 100 in accordance with an embodiment of the present invention. As shown in FIG. 1, communications system 100 includes turret systems 102a, 102b, . . . 102n communicatively coupled to turret devices 106a, 106b, . . . 106n, Private Branch Exchange (PBX) switch 110 communicatively coupled to a PBX phone 112, and an internet protocol (IP) network 114. Each turret device 106 includes multiple handsets 105 and provides a user interface which allows users 101 to access and use resources (e.g., user 101a at turret 106a, user 101b at turret 106b, and so on). It should be understood that the number and types of handsets, headsets or other communication devices may be implemented in any number of ways, and that the arrangement shown in FIG. 1 is merely an example of such an arrangement.

Similarly users of softphone 108 (not shown) or PBX phone 112 (150) can access and use turret system resources available to them. In an example embodiment, a SIP line card (not shown) in turret device 106 operates as a SIP gateway to the switching fabric of the turret system 102. A turret system 102 can communicate with other turret systems, at least one PBX switch 110, or at least one remote computing device 108 over IP network 220.

A turret device 106 is the primary user device as it provides displays, accepts microphone input, outputs audio through speakers, and controls handsets, buttons and light emitting diodes (LEDs) for the features of communication system 100. A computing device 108 can also be programmed to implement these features, as can a PBX phone 112 that has been configured to share resources with turret systems 106. A user 101 can communicate with other users using audio. To that end, a user 101 can wear a telephonic headset 104, and also has the option to communicate using a handset 105 or a hoot-n-holler microphone and speaker built into or communicatively coupled to the turret device 106.

Figure 2:
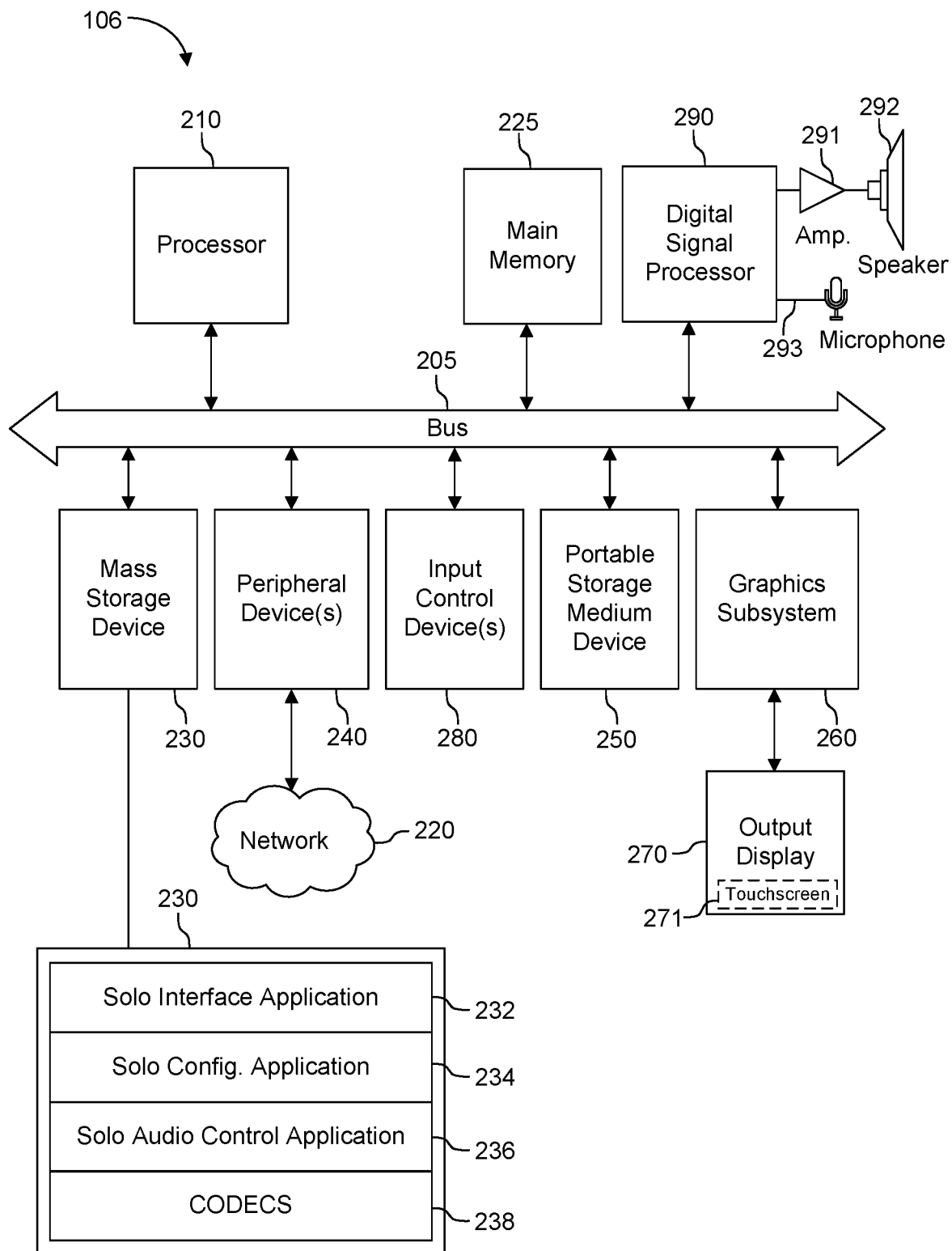
FIG. 2 is a block diagram of a turret device according to an example embodiment.

FIG. 2 is a block diagram of an example turret device 106 in accordance with some of the example embodiments described herein. Turret device 106 may include without limitation a processor 210, a main memory 225, and an interconnect bus 205. Processor 210 may include without limitation a single microprocessor, or may include a plurality of microprocessors for configuring the turret device 106 as a multi-processor system. The main memory 225 (which is a non-transitory memory) stores, among other things, instructions and/or data for execution by the processor 210. The main memory 225 may include banks of dynamic random access memory (DRAM), as well as cache memory.

Turret device 106 may further include a non-transitory mass storage device 230, peripheral device(s) 240, portable non-transitory storage medium device(s) 250, input control device(s) 280, a graphics subsystem 260, and/or an output display interface 270 having a touch screen interface 271. In this example, all of the components in turret device 106 in FIG. 2 are shown as being coupled via the bus 205. However, the turret device 106 is not so limited. Elements of the turret device 106 may be coupled via one or more other data transport means. For example, the processor 210 and/or the main memory 225 may be coupled via a local microprocessor bus. The mass storage device 230, peripheral device(s) 240, portable storage medium device(s) 250, and/or graphics subsystem 260 may be coupled via one or more input/output (I/O) buses. The mass storage device 230 may be a non-volatile storage device for storing data and/or instructions for use by the processor 210. The mass storage device 230 may be implemented, for example, with a magnetic disk drive or an optical disk drive. In a software embodiment, the mass storage device 230 is configured for loading contents of the mass storage device 230 into the main memory 225.

Mass storage device 230 additionally stores a solo interface application 232 (or simply "interface application"), a solo configuration application 234 (or simply "configuration application"), a solo audio control application 236 (or simply "audio control application") and CODECs 238. These applications are not limited to this particular software configuration. The software components may be combined into one application or divided into additional components. Solo interface application 232 provides a mechanism for inputting information into turret device 106 through touchscreen interface 271 in accordance with the example aspects of the present invention. The solo interface application 232 in conjunction with input control device 280, graphic subsystem 260 and output display 270 allows a user to select a displayed icon or element by touching the screen in a location corresponding to the desired icon or element. It should be understood that the touchscreen interface 271 and solo interface application 232 of the turret device 106 are merely exemplary. Other types of interfaces and corresponding interface applications can be used and still be within the scope of the invention. Accordingly, in the following example embodiments the touchscreen interface 271 can be replaced with other forms of input interfaces such as physical buttons, voice recognition (e.g., voice recognition where an audio channel number or command is spoken), and the like.

Solo configuration application 234 is invoked for saving and changing the audio configuration settings for each communication channel in conjunction with mass storage device 230. The settings for each speaker channel, including its preset solo volume can be stored in mass storage device 230. The configuration can be set prior to instantiation of any communication channels or afterwards.

The portable storage medium device 250 operates in conjunction with a nonvolatile portable storage medium, such as, for example, flash memory, to input and output data and code to and from turret device 106. In some embodiments, the software for storing information may be stored on a portable storage medium, and may be inputted into turret device 106 via the portable storage medium device 250. The peripheral device(s) 240 may include any type of computer support device, such as, for example, an input/output (I/O) interface configured to add additional functionality to turret device 106. For example, the peripheral device(s) 240 may include a network interface card for interfacing the turret device 106 with network 220.

Input control devices 280 can control the operation and various functions of turret device 106. Input control devices 280 can include any components, circuitry, or logic operative to drive the functionality of turret device 106. For example, input control device(s) 280 can include one or more processors acting under the control of an application in mass storage device 230. The input control device(s) 280 may include a keypad and/or a cursor control device (not shown). The keypad may be configured for inputting alphanumeric characters and/or other key or button information. The cursor control device may include, for example, a handheld controller or mouse, a trackball, a stylus, and/or cursor direction keys.

Display textual and graphical information may be displayed through the graphics subsystem 260 and the output display 270. The graphics subsystem 260 receives textual and graphical information, and processes the information for output to the output display 270. The output display 270 may include a display such as a CSTN (Color Super Twisted Nematic), TFT (Thin Film Transistor), TFD (Thin Film Diode), OLED (Organic Light-Emitting Diode), AMOLED display (Activematrix organic light-emitting diode), and/or liquid crystal display (LCD)-type displays. Output display 270 can also include a touchscreen interface 271. Example types of touchscreen interfaces include 5-Wire Resistive, Surface Capacitive, Projected Capacitive, SAW (Surface Acoustic Wave) and Infrared, and the like.

In one embodiment, turret device 106 also includes a digital signal processor (DSP) 290 for processing voice communications. DSP 290 may have its own bank of non-transitory synchronous dynamic random access memory (SDRAM). DSP 290 may also have its own writable non-transitory non-volatile serial read only memory (ROM) to store miscellaneous parameters. DSP 290, processor 210, and audio control application 236 are used, in part, to support speaker volume functions described in more detail below. It should be understood that the digital signal processor can be implemented in processor 210.

An aggregated interface of the data from multiple data sources can be presented to DSP 290 (e.g., via network 220 and peripheral device(s) 240 of FIG. 2) and output to a speaker 292 via an audio amplifier 291. For simplicity, audio amplifier 291 and/or speaker 292 are sometimes referred to herein simply as a turret output audio device. Audio signals can be input into DSP 290 for audio signal processing via microphone 293 as well. It should be understood that a turret device 106 may have other components not shown in FIG. 2.

Processor 210 causes incoming audio payloads from network 220 to be delivered to DSP 290 over bus 205. DSP 290, in turn, processes the audio payloads and uses CODECs 238 (encoder A/D, and decoder D/A) to code and decode and/or compress and decompress the digital data streams of audio in the payloads. Outgoing voice traffic originates from a microphone (e.g., microphone 293 of FIG. 2) and is formatted by DSP 290 and forwarded over bus 205 to processor 210 for transmission over the network 220. CODECs 238 interfaces to all of the transducer elements (e.g., handset(s) 105 of FIG. 1, speaker(s) 292, speaker modules, microphone(s) 293, and the like).

Figure 3:
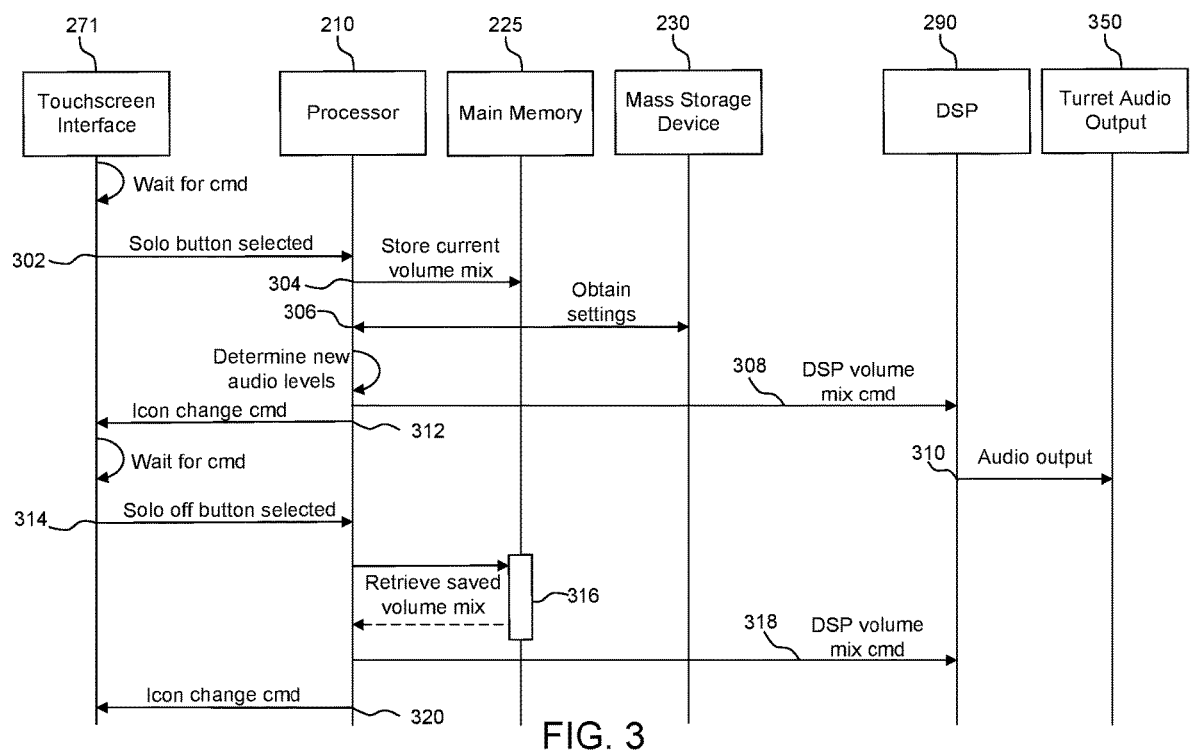
FIG. 3 is sequence diagram in accordance with an aspect of the present invention.

FIG. 3 is an example sequence diagram showing the operations of solo interface application 232, solo configuration application 234, solo audio control application 236 and CODECs 238. Particularly, solo interface application 232, solo configuration application 234, solo audio control application 236 and CODECs 238 are instructions, which when executed by processor 210, main memory 225, mass storage device 230, DSP 290, amplifier 291 and/or speaker 292 of turret 106 FIGS. 1 and 2, cause turret device 106 to perform operations associated with receiving a solo speaker channel request via an interface, initiating a solo speaker channel, processing the audio associated with several speaker channels, cancelling a solo speaker channel, and configuring and saving the settings of communication channels of a turret 106 associated with a solo speaker channel.

In some embodiments, audio and/or video communications data is received by turret device 106 from multiple data sources. An aggregated interface of this data can be presented to DSP 290 and output to an amplifier 291 and a speaker 292 (the amplifier 291 and speaker 292 collectively referred to as turret audio output 350) such that the audio obtained from all the sources is output simultaneously. While the speaker channel audio for the data sources is being output from turret audio output 350, the solo interface application 232 awaits an input via, for example, touchscreen interface 271 ("wait for cmd"). If a solo speaker channel has not yet been activated then the solo interface application awaits for a solo-on command for a solo speaker channel.

Upon selection of an icon displayed on output display 270 indicating which communication channel has been selected to be configured to be a solo-speaker channel, interface application 232 communicates the selection to solo configuration application 234 which in turn causes processor 210 to determine which icon was touched. As shown in step 302, if the selection corresponds to a solo icon (also referred to herein as a "solo button"), an example of which is shown below in connection with FIG. 4, then processor 210 determines which channel was selected to be a solo speaker channel.

It should be understood that the selection process could be the pressing of a button (physical or touchscreen) that represents a speaker channel, or any other mechanism (e.g., voice recognition where the audio channel number is spoken).

Solo configuration application 234 causes processor 210 to store the current volume mixer settings for all the applicable speaker channels in main memory 225 (e.g., volatile storage) as shown at step 304 and to obtain the audio channel settings for all the pertinent communication channels associated with the selected solo speaker channel from mass storage device 230 as shown at step 306. Hereinafter, main memory 225 and mass storage device 230 are sometimes referred to individually or collectively as "memory." While in this example embodiment these memories are depicted as independent memories, in other embodiments they may be the same.

In one example embodiment, a non-solo audio level configuration setting value corresponding to at least one non-solo speaker channel and a solo audio level configuration setting value corresponding to a solo speaker channel are stored in memory 230.

Solo configuration application 234 then causes processor 210 to determine the audio level settings for all of the communication channels associated with the solo speaker channel ("determine new audio levels).

It should be understood that the number of communication channels may vary (e.g., 2-, 4-, 6-, 8-, 16-, 32-, etc.). In the example described below in connection with FIG. 4, there can be up to 16 simultaneous communication channels output through a speaker (e.g., 292 of FIG. 2) of a turret speaker device.

Solo audio control application 236 is executed by processor 210 to control DSP 290 to determine new audio levels of (or make adjustments to) the speaker channels. The particular audio level adjustment(s) can vary depending on the state of the turret device as described in more detail below. In step 308, DSP 290, in turn, is commanded by processor 210 in conjunction with CODECs 238 to output the audio signals to the turret audio output 350 (e.g., amplifier 291 and speaker 292 of FIG. 2) according to the settings associated with the selected audio speaker channel. DSP then outputs the audio output to be output by turret audio output 350, as shown in step 310.

At step 312, solo interface application 232 causes processor 210 to change the solo speaker channel icon displayed on output display 270 of FIG. 2 to indicate the new status of the selected solo speaker channel. Example states of speaker channels are described below in connection with FIGS. 4A and 4B.

Once a speaker channel has been selected to be a solo speaker channel, touchscreen interface 271 waits for another selection to be made ("wait for cmd"), such as to deactivate the solo speaker channel, select a new solo speaker channel, or adjust the solo speaker channel volume.

The current selected (or active) solo speaker channel can be deactivated by different events, such as: deselecting the current solo speaker channel, selecting a different speaker channel to be the new solo speaker volume speaker channel, changing the volume on the active non-decreased volume speaker channel, or removal, disablement, or detection of a faulty speaker channel. Upon the other selection being made, processor 210 causes the speaker channel icon to change accordingly, as shown in step 320 of FIG. 3.

If the selection is associated with an operation that deactivates or otherwise changes the setting of the solo speaker (i.e., the speaker channel in solo mode) as shown in step 314, then the volume mixture of the applicable speaker channels that was previously saved (step 304) is retrieved from main memory 225 by processor 210 as shown in step 316. In step 318, DSP 290, in turn, is commanded by processor 210 in conjunction with CODECs 238 to output the audio signals to the turret audio output 350 according to the settings associated with the retrieved volume mixture obtained in step 316. DSP then outputs the audio output to be output by turret audio output 350, as shown in step 310.

Upon receiving and processing a command through the interface, in this example embodiment, the process waits for a subsequent command (e.g., "wait for cmd").

Processor 210 and DSP 290 can provide different audio level schemas, as will now be described in more detail.

In accordance with some embodiments, a single audio channel of several simultaneously active audio channels that is of most significance (i.e., a prioritized solo speaker channel) is selected via touchscreen 271. Upon this single selection, processor 210 controls DSP 290 to decrease the audio level of all the other audio channels to a predetermined level, such that the selected solo speaker channel is more audible than the rest.

In one embodiment, the audio speaker channels other than the solo speaker channel are muted. This allows an operator to focus solely on a specific speaker channel (i.e., the solo speaker channel). These other channels are referred to herein as "non-solo speaker channels".

In another embodiment, the other speaker channels are reduced to a level that allows them to remain audible (i.e., the audio signals generated output from speaker 292 are capable of being heard) after the change has been effected. This allows an operator to continue to monitor the non-solo speaker channels.

Alternatively, the selected solo speaker channel is raised and the non-solo speaker channels are lowered.

In yet another embodiment, the selected solo speaker channel is raised (i.e., amplified) while at substantially the same time the audio levels of the non-solo speaker channels are left alone. This can be accomplished by either prestoring the amplification level of a solo speaker channel or by providing the operator the ability to raise the level of just one speaker channel. In an example embodiment, long pressing the solo speaker button 404 of FIG. 4 causes a slider (e.g., a volume bar) to appear on the display that can, in turn, be adjusted through input from the operator.

In yet another embodiment, upon a long press of the solo speaker button, solo interface application causes processor 210 to display a volume bar onto the output display 270 of FIG. 2. By adjusting the volume bar, an operator can adjust the volume manually. In this embodiment, solo audio control application 236 can cause processor 210 to raise the audio level of the solo speaker channel while simultaneously lowering the audio level of the other speaker channels. For example, for every x dB (e.g., 0.5 dB) the audio level of the solo speaker is raised the audio level of the non-solo speaker channels are lowered by y dB (e.g., 1 db).

In still another embodiment, other combinations of user audio level settings can be used. For example, one set of speaker channels can be selected by selecting one at a time such that their audio level is higher than another set of speaker channels.

In yet another example, the audio decrease level of the speaker channels that have not been selected can be hard-coded or stored in, for example, memory 330.

The audio volume decrease of all speaker channels but the one selected can also be adjusted based on the results of an audio signal analysis performed on the current environment. Particularly, the level of volume adjustment can be changed based on the different noise levels of the environment. In this embodiment, a microphone (e.g., 293 of FIG. 2) or multiple microphones can be used to obtain the current environment sounds, which in turn are processed by DSP 290. In turn, DSP 290 provides information to the processor 210 corresponding to one or more sound attributes. Processor 210, in turn, compares the one or more sound attributes, information to threshold values and adjusts the audio levels accordingly.

In one example aspect, a user can set different volume controls on a per speaker channel basis, where the volume lowering technique is a differential of current settings of the turret. In this embodiment, solo configuration application would cause these settings to be saved in, for example, mass storage device 230. In an example embodiment, if turret 106a of FIG. 1 has solo speaker channel 1 running at x dB, and speaker channel 2 at y dB, setting speaker channel 3 as a so called solo-speaker mode and a volume decrease value to 12 dB, then speaker channel 1 volume will be x-12 dB, and channel 2 speaker volume will be y-12 dB.

It should be understood that the aforementioned attenuation levels are examples. Other attenuation levels can be selected and still be within the scope of the invention. In an alternative embodiment, the attenuation level of each speaker channel can be preset individually and be the same or different from each other.

In some examples, the audio of single speaker channel can be isolated with respect to other active speaker channels by reducing the audio level of the non-selected speaker channels by a predetermined amount relative to the chosen speaker channel. By selecting this option the volume of the chosen speaker channel will remain the same while the volume of all other speaker channels will be decreased by a predetermined level relative to the chosen speaker channel (e.g., 12 decibels lower than the solo speaker channel).

In another example embodiment, solo-speaker can be enabled only for speakers that are on. In another example embodiment, the solo-speaker state is not persisted across logons.

Figure 4A:
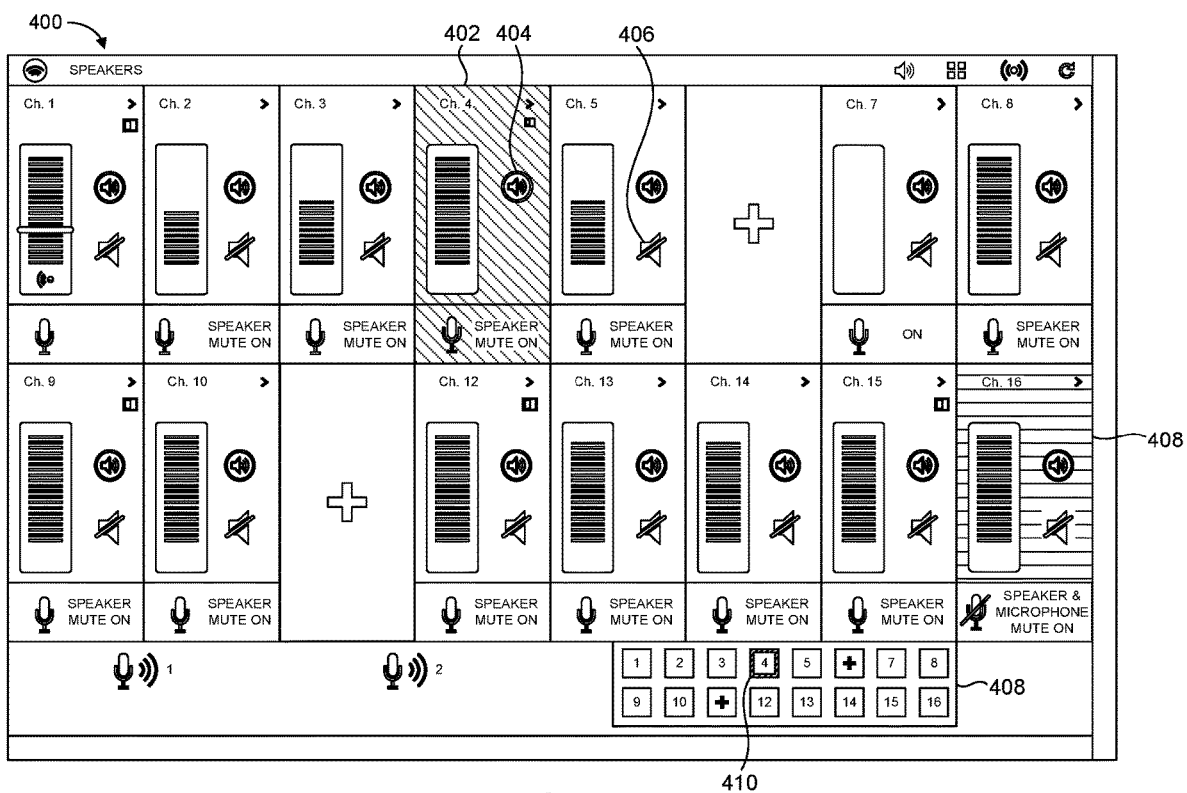
FIGS. 4A and 4B illustrate a screenshot of an example output display and touchscreen interface of a turret device in accordance with an embodiment of the present invention.
Figure 4B:
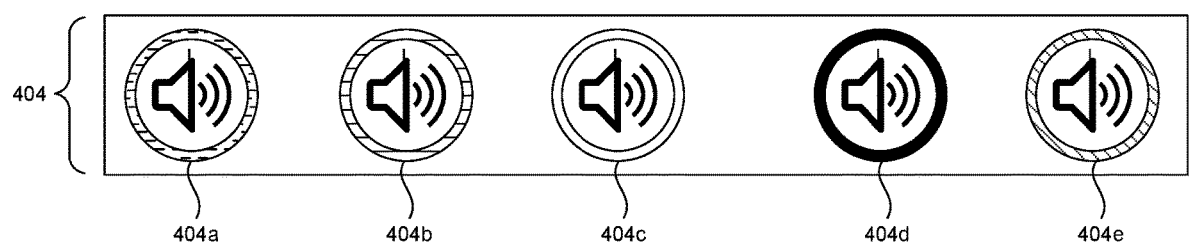

FIGS. 4A and 4B illustrate a screenshot of an example output display and touchscreen interface of a turret device in accordance with an embodiment of the present invention, where FIG. 4B is a legend showing different symbols representing speaker channel modes.

In this example, the turret device has sixteen (16) communication channels (Ch. 1, Ch. 2, . . . , Ch. 16). However, it should be understood that there can be any number of communication channels.

Each communication channel 402 has a solo-button icon 404 associated with it. Particularly, the solo-button icon 404 indicates the solo state for that corresponding speaker channel. When the speaker channel is in solo mode, it is referred to as a solo speaker channel and when it is not in a solo mode, it is referred to as a non-solo speaker channel. As explained above in connection with the sequence diagram 300 of FIG. 3, when the solo-button icon is selected, the corresponding solo speaker channel is invoked. In this example, the solo speaker channel for communication channel 4 (i.e., "Ch. 4") has been invoked.

In an example aspect, a change in state of the communication channel is represented by a change in color, which in FIG. 4A is represented by hatch markings. The change in state of a speaker channel can also be represented by a speaker channel status summary 408. As shown in the speaker status summary 408 of FIG. 4A, the image representing channel 4 (410) is different from the other images representing the other speaker channels.

When one of the various communication channels is in solo mode (symbol 404e in FIG. 4B), the solo-button icons for the other channels are grayed out (symbol 404a in FIG. 4B) to indicate that they are in a non-solo mode.

As described above, once a speaker channel has become a solo speaker channel, touchscreen interface 271 waits for another selection to be made. The current solo speaker channel can be deselected as explained above, for example, by pressing the solo-button again. This causes the solo-button icon to change to symbol 404a of FIG. 4B.

Upon selection of the solo-off command button (e.g., depressing the solo-button 404 for the speaker channel that has been selected as the solo-speaker channel), interface application 232 communicates the selection to solo configuration application 234 which in turn causes processor 210 to obtain the non-solo mode settings for all the applicable speaker channels from memory 230 and causes the audio level of any speaker channel that has been raised or lowered to go back to its normal state as described above in connection with FIG. 3.

Legend key 404 of FIG. 4B illustrates other symbols corresponding to the possible states of a solo speaker channel. It should be understood that in FIG. 4B the different states are represented by hatch markings. A color fill or other indication can be used instead. Default symbol 404a depicts a default state in which a particular solo speaker channel is not active. If FIG. 4B were in color, symbol 404a could be, for example, gray. Intermediate symbol 404b represents a state between a user initially selecting the solo button to invoke it and the speaker channel becoming a solo speaker channel. Upon selection of the solo button 404, it will temporarily turn to intermediate symbol 404b or another color (e.g., blue), indicating that the soft button has been depressed. After depressing the solo button 404 for a predetermined time (e.g., several milliseconds), the solo button symbol changes from intermediate symbol 404b to solo-selected symbol 404e or another color (e.g., green) indicating that solo mode for that particular solo speaker channel has been invoked.

Solo-disabled symbol 404d indicates that the speaker channel cannot be placed in solo mode. In other words, when a speaker channel is disabled, the speaker channel is in a solo-disabled mode and its audio level cannot be adjusted (i.e., its audio level cannot be raised or lowered other than through a normal volume control).

Solo latched symbol 404c indicates that a solo speaker channel has been selected on a channel in which the microphone has been latched open. Similarly, the color of 404c can change (e.g., to white).

In one embodiment, when the solo button 404 is long-pressed, that button becomes a slider, allowing the volume of the solo channel to be customized.

In another embodiment, turret 106 can be configured to have a solo-speaker enabled for one speaker, such that the solo button icon for the other speakers might be a different color, e.g., red.

In still another example, solo-speaker mode is activated by a selecting the solo-speaker button on the target speaker channel, whereas solo-speaker mode can be deactivated by one of the following actions: tap the solo-speaker button of the speaker in solo-speaker mode, increase or decrease volume 410 on a different speaker, or activate solo-speaker mode on a different speaker.

In still another aspect, the effect of mute when a speaker channel is in solo-speaker mode depends on the modes currently set for each speaker. For example, pressing mute on a speaker channel in a solo-speaker mode causes the solo-speaker channel to be muted, whereas the other active channels remain attenuated. If a speaker channel is in solo-speaker mode and is currently muted, the solo-speaker is un-muted, and other active channels will remain attenuated. Pressing mute on a speaker on non-solo channel causes that channel to be muted, whereas the solo-speaker is not affected, and other active channels remain attenuated. Pressing mute on a speaker in a non-solo channel will un-mute and attenuate that speaker, not affect the solo-speaker channel, and other active channels will remain attenuated.

Meanwhile, in some examples, the effect of pressing the solo-mode button when a speaker is muted is as follows: if "solo-speaker" mode is selected for a muted channel, the results are the same as pressing mute on a speaker in solo-speaker mode, and if "solo-speaker" mode is selected on an un-muted channel when there is an active channel muted, the results are the same as pressing mute on non-solo channel, as discussed above.

The pre-solo audio levels of all the speaker channels can be pre-stored in memory. When they are returned to a non-solo state, they return back to the saved state.

Software embodiments of the example embodiments presented herein may be provided as a computer program product, or software, that may include an article of manufacture on a machine-accessible or machine-readable medium having instructions. The instructions on the non-transitory machine-accessible, machine-readable or computer-readable medium may be used to program a computer system or other electronic device. The machine or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-4 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A turret device, comprising:
   at least one microphone;
   at least one speaker;
   at least one processor operable to aggregate active speaker channels, each of the active speaker channels being associated with a communication channel configured to provide audio output to the at least one speaker of the turret device and to receive audio input from the at least one microphone of the turret device;
   an output display operable to display a solo button icon, a microphone mute icon, and a speaker mute icon each corresponding to one of the active speaker channels;
   an input interface communicatively coupled to the at least one processor and operable to receive a selection of a first solo speaker channel by a selecting of a first solo button icon corresponding to a first of the active speaker channels and further operable to receive a selection of a second solo speaker channel by selecting of a second solo button icon corresponding to a second of the active speaker channels, the input interface being further operable to receive a selection of each microphone mute button icon and each speaker mute button icon;

the at least one processor operable, in response to the selecting of the first solo button icon, to set an audio level of the first solo speaker channel at at least one of the at least one speaker and to attenuate an audio level at at least one of the at least one speaker of at least first and second non-solo speaker channels of the active speaker channels, and further operable, in response to the selecting of the second solo button icon, to set an audio level at at least one of the at least one speaker of the second solo speaker channel and to attenuate an audio level at at least one of the at least one speaker of at least the first and a third non-solo speaker channels of the active speaker channels;

the at least one processor being further operable, in response to a selection of each microphone mute button icon, to mute the at last one microphone only for the corresponding active speaker channel; and the at least one processor being further operable, in response to a selection of each speaker mute button icon, to mute the at least one speaker only for the corresponding active speaker channel, wherein, in response to the selecting of the first solo button icon, the audio level at at least one of the at least one speaker for the first solo speaker channel remains unchanged and the audio level at at least one of the at least one speaker for the first non-solo speaker channel attenuates to a first attenuation level and the audio level at at least one of the at least one speaker for the second non-solo speaker channel attenuates to a second attenuation level that is different from the first attenuation level such that each of the first and second non-solo speaker channels remains audible at at least one of the at least one speaker; and wherein, in response to the selecting of the second solo button icon, the audio level at at least one of the at least one speaker for the second solo speaker channel remains unchanged and the audio level at at least one of the at least one speaker for each of the at least first and third non-solo speaker channels attenuates by a predetermined level such that each of the first and third non-solo speaker channels remains audible at at least one of the at least one speaker.

2. The turret device of claim 1, further comprising:
a memory operable to store a non-solo speaker channel audio level offset value, wherein in response to the selection of the first solo speaker channel, the at least one processor attenuates one of the first and second non-solo speaker channels based on the non-solo speaker channel audio level offset value.

3. The turret device of claim 1, further comprising:
a memory operable to store a non-solo audio level configuration setting value corresponding to each of the first and second non-solo speaker channels and a solo audio level configuration setting value corresponding to the first solo speaker channel,
wherein, in response to the selection of the first solo speaker channel, the at least one processor uses the non-solo audio level configuration setting values to set the audio level for the first and second non-solo speaker channels and the solo audio level configuration setting value to set the audio level for the first solo speaker channel.

4. The turret device of claim 1, wherein each of the solo button icons indicates a solo mode state of a corresponding one of the active speaker channels, wherein the at least one processor causes the solo button icon to change to a different icon based on the solo mode state of each one of the active speaker channels, correspondingly.

5. The turret device of claim 1, wherein depressing one of the solo button icons for a predetermined time causes a solo channel volume control to be displayed on the output display.

6. A method for controlling volume of multiple simultaneous calls, comprising the steps of:
aggregating, with a turret device, active speaker channels, each of the active speaker channels being associated with a communication channel configured to provide audio output to at least one speaker of a turret device and to receive audio input from at least one microphone of the turret device;

providing an output display displaying a solo button icon, a microphone mute button icon, and a speaker mute button icon each corresponding to one of the active speaker channels;

receiving, through an input interface, a selection of a first solo speaker channel by a selecting of a first solo button icon corresponding to a first of the active speaker channels;

receiving, through the input interface, a selection of a second solo speaker channel by a selecting of a second solo button icon corresponding to a second of the active speaker channels;

receiving, through the input interface, a selection of each of the microphone mute button icon and the speaker mute button icon each for the corresponding active speaker channel;

in response to the selecting of the first solo button icon:
setting an audio level of the first solo speaker channel at at least one of the at least one speaker; and
attenuating an audio level at at least one of the at least one speaker of at least first and second non-solo speaker channels of the active speaker channels; and in response to the selecting of the second solo button icon:
setting an audio level at at least one of the at least one speaker of the second solo speaker channel; and
attenuating an audio level at at least one of the at least one speaker of at least the first and a third non-solo speaker channels of the active speaker channels;

in response to the selection of the microphone mute button icon, muting the at last one microphone only for the corresponding active speaker channel; and in response to the selection of the speaker mute button icon, muting the at least one speaker only for the corresponding active speaker channel, wherein, in response to the selecting of the first solo button icon, the audio level at at least one of the at least one speaker for the first solo speaker channel remains unchanged and the audio level at at least one of the at least one speaker for the first non-solo speaker channel attenuates to a first attenuation level and the audio level at at least one of the at least one speaker for the second non-solo speaker channel attenuates to a second attenuation level that is different from the first attenuation level such that each of the first and second non-solo speaker channels remains audible at at least one of the at least one speaker; and wherein, in response to the selecting of the second solo button icon, the audio level at at least one of the at least one speaker for the second solo speaker channel remains unchanged and the audio level at at least one of the at least one speaker for each of the at least first and third non-solo speaker channels attenuates by a predetermined level such that each of the first and third non-solo speaker channels remains audible at at least one of the at least one speaker.

7. The method of claim 6, further comprising, in response to the selection of the first solo speaker channel, attenuating one of the first and second non-solo speaker channels based on a stored non-solo speaker channel audio level offset value.

8. The method of claim 6, further comprising:
in response to the selection of the first solo speaker channel, using a stored non-solo audio level configuration setting value to set the audio level for the first and second non-solo speaker channels; and
using a stored solo audio level configuration setting value to set the audio level for the first solo speaker channel.

9. The method of claim 6, wherein each of the solo button icons indicates a solo mode state of a corresponding one of the active speaker channels, the method further comprising:
changing the solo button icon on the output display to a different icon based on a solo mode state of each one of the speaker channels, correspondingly.

10. The method of claim 6, further comprising:
displaying, on the output display, a solo channel volume control in response to depressing one of the solo button icons for a predetermined time.

11. A non-transitory computer-readable medium having stored thereon one or more sequences of instructions for causing at least one processor to perform:
aggregating, with a turret device, active speaker channels, each of the active speaker channels being associated with a communication channel configured to provide audio output to at least one speaker of a turret device and to receive audio input from at least one microphone of the turret device;
providing an output display displaying a solo button icon, a microphone mute button icon, and a speaker mute button icon each corresponding to one of the active speaker channels;
receiving, through an input interface, a selection of a first solo speaker channel by a selecting of a first solo button icon corresponding to a first of the active speaker channels;
receiving, through the input interface, a selection of a second solo speaker channel by a selecting of a second solo button icon corresponding to a second of the active speaker channels;
receiving, through the input interface, a selection of each of the microphone mute button icon and the speaker mute button icon each for the corresponding active speaker channel;
in response to the selecting of the first solo button icon:
setting an audio level of the first solo speaker channel at at least one of the at least one speaker; and
attenuating an audio level at at least one of the at least one speaker of at least first and second non-solo speaker channels of the active speaker channels;
in response to the selecting of the second solo button icon:
setting an audio level at at least one of the at least one speaker of the second solo speaker channel; and
attenuating an audio level at at least one of the at least one speaker of at least the first and a third non-solo speaker channels of the active speaker channels;
in response to the selection of the microphone mute button icon, muting the at last one microphone only for the corresponding active speaker channel; and
in response to the selection of the speaker mute button icon, muting the at least one speaker only for the corresponding active speaker channel,
wherein, in response to the selecting of the first solo button icon, the audio level at at least one of the at least one speaker for the first solo speaker channel remains unchanged and the audio level at at least one of the at least one speaker for the first non-solo speaker channel attenuates to a first attenuation level and the audio level at at least one of the at least one speaker for the second non-solo speaker channel attenuates to a second attenuation level that is different from the first attenuation level such that each of the first and second non-solo speaker channels remains audible at at least one of the at least one speaker; and
wherein, in response to the selecting of the second solo button icon, the audio level at at least one of the at least one speaker for the second solo speaker channel remains unchanged and the audio level at at least one of the at least one speaker for each of the at least first and third non-solo speaker channels attenuates by a predetermined level such that each of the first and third non-solo speaker channels remains audible at at least one of the at least one speaker.

12. The non-transitory computer-readable medium of claim 11, further having stored thereon a sequence of instructions for causing the at least one processor to perform:
attenuating one of the first and second non-solo speaker channels based on a stored non-solo speaker channel audio level offset value.

13. The non-transitory computer-readable medium of claim 11, further having stored thereon a sequence of instructions for causing the at least one processor to perform:
in response to the selection of the first solo speaker channel, using a stored non-solo audio level configuration setting value to set the audio level for the first and second non-solo speaker channels; and
using a stored solo audio level configuration setting value to set the audio level for the first solo speaker channel.

14. The non-transitory computer-readable medium of claim 11, wherein each of the solo button icons indicates a solo mode state of a corresponding one of the active speaker channels, the non-transitory computer-readable medium further having stored thereon a sequence of instructions for causing the at least one processor to perform:
changing the solo button icon on the output display to a different icon based on a solo mode state of each one of the speaker channels, correspondingly.

15. The non-transitory computer-readable medium of claim 11, further having stored thereon a sequence of instructions for causing the at least one processor to perform:
displaying, on the output display, a solo channel volume control in response to depressing one of the solo button icons for a predetermined time.

16. A non-transitory computer-readable medium having stored thereon one or more sequences of instructions for causing at least one processor to perform:

aggregating, with a turret device, active speaker channels, each of the active speaker channels being associated with a communication channel configured to provide audio output to at least one speaker of a turret device and to receive audio input from at least one microphone of the turret device;

providing an output display displaying a solo button icon for each of the active speaker channels;

receiving, through an input interface, a selection of a first solo speaker channel by a selecting of a first solo button icon representing a first of the active speaker channels;

receiving a selection of a second solo speaker channel by a selecting of a second solo button icon representing a second of the active speaker channels;

in response to the selecting of the first solo button icon:
  setting an audio level of the first solo speaker channel at at least one of the at least one speaker; and
  attenuating an audio level at at least one of the at least one speaker of at least first and second non-solo speaker channels of the active speaker channels; and in response to the selecting of the second solo button icon:
  setting an audio level at at least one of the at least one speaker of the second solo speaker channel; and
  attenuating an audio level at at least one of the at least one speaker of at least the first and a third non-solo speaker channels of the active speaker channels, wherein, in response to the selecting of the first solo button icon, the audio level at at least one of the at least one speaker for the first solo speaker channel remains unchanged and the audio level at at least one of the at least one speaker for the first non-solo speaker channel attenuates to a first attenuation level and the audio level at at least one of the at least one speaker for the second non-solo speaker channel attenuates to a second attenuation level that is different from the first attenuation level such that each of the first and second non-solo speaker channels remains audible at at least one of the at least one speaker; and wherein, in response to the selecting of the second solo button icon, the audio level at at least one of the at least one speaker for the second solo speaker channel remains unchanged and the audio level at at least one of the at least one speaker for each of the at least first and third non-solo speaker channels attenuates by a predetermined level such that each of the first and third non-solo speaker channels remains audible at at least one of the at least one speaker.

\* \* \* \* \*